Patented Oct. 2, 1951

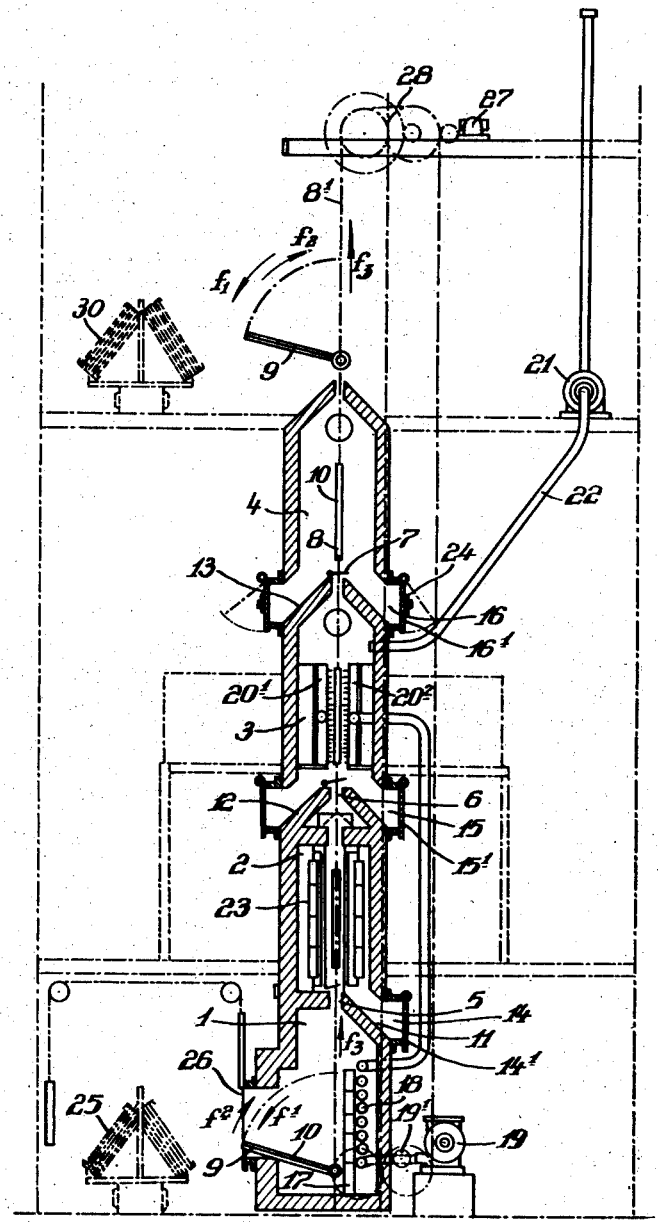

2,569,951

UNITED STATES PATENT OFFICE 2,569,951

APPARATUS FOR THE MANUFACTURE OF HARDENED GLASS

Leon Rembaux, deceased, late of Brussels, Belgium, by Anna Lucie Robert Rembaux and Germaine Mathilde Valerie Rembaux Thomassin, sole representatives, both of Brussels, Belgium Application July 24, 1947, Serial No. 763,382
In Belgium September 1, 1941

Section 1, Public Law 690, August 8, 1946
Patent expires September 1, 1961

5 Claims. (Cl. 49—47)

At present the use of hardened glass has developed considerably principally in the automobile industry. Such glass has indeed a great resistance to impact and when breaking, it only forms small fragments without sharp edges and therefore giving rise to no danger.

The object of the present invention to obviate the inconveniences of the working furnaces in use; it relates firstly to an improvement according to which the glass sheets or plates are moved vertically in successive heating rooms, so that this thermal treatment may be carried out with minimum deformation and minimum handling of the sheet which keeps a uniform thickness over its whole surface, whereby the risk of breakage of the glass sheet is also reduced.

The invention extends to an apparatus which is of particular advantage in carrying out the process above mentioned and is characterized by a plurality of compartments placed vertically above each other, for the glass sheets being treated passing therethrough.

The invention further extends to other features hereinafter described and to various combinations thereof.

An apparatus according to the invention is illustrated by way of example in the accompanying drawing which shows a diagrammatical vertical section of the whole apparatus. The apparatus comprises in accordance with the invention a plurality of compartments 1, 2, 3, 4 placed above each other in vertical alignment and having walls made of a refractory and heat insulating material.

Compartment 1 in which the glass plates are shut in, is the preheating compartment.

Compartment 2 is the high temperature heating compartment.

Compartment 3 is the aerothermal treatment compartment.

In this compartment the glass plates are subjected to the action of superheated air under pressure at 250° C., which produces tempering or hardening.

Compartment 4 is the temperature cooling compartment. Its function is to realize a thermal transition from compartment 3 to the surrounding atmosphere.

These various compartments 1, 2, 3, 4 are connected with each other by openings 5, 6, 7 through which passes an endless chain 8, one of the vertical strands $8^1$ of which moves in the vertically placed compartments 1, 2, 3, 4. This chain 8 carries tiltable trays or frames 9 adapted to receive the glass plates 10.

The bottom 11, 12, 13 of each compartment 2, 3, 4 has an inclined shape, and the slope thus formed ends in an opening such as 14, 15, or 16 closed by a valve 14', 15', 16'. The openings 14, 15, 16 are intended to evacuate the fragments of glass which might be due to the breaking of a glass plate being treated, and would get to the openings 14, 15, 16 after sliding on the inclined surfaces 11, 12, 13. The heating of the various compartments is carried out in the following manner:

Compartment 1 contains an electric radiator such as 17 which directly heats said compartment so as to impart thereto the required preheating temperature. This radiator 17 moreover is combined with an air heating coil 18. The air driven by a compressor 19, is driven into the coil 18 then led into compartment 3.

A receptacle 19' with a filter may be interposed between the compressor 19 and the coil 18.

The injection of hot air into compartment 3 occurs through two multitubular collectors $20^1$, $20^2$ with multiple ejecting nozzles. Each row of collectors $20^1$, $20^2$ may be moved while keeping parallel, so that they may be moved at will away from the conveyor 8.

The cooled air is evacuated by means of a sucking apparatus 21, which sucks this air through a pipe 22.

Compartment 2 is heated directly by an electric radiator 23 adapted to give a high temperature.

As to compartment 4, this is heated by the residual heat from compartment 3. This compartment 4 is provided with air regulating valves arranged on the doors $16^1$.

The apparatus described above works in the following manner:

The glass plates 10 to be hardened are brought by a truck 25 or by a conveyor in front of the opening 26 for charging compartment 1.

Each glass plate is placed on one of the trays or frames 9 on the endless chain, after said frame has been tilted in the direction of arrow $F^1$.

Once the glass sheet is fitted on the said frame 9, the latter is tilted back in the direction of arrow $F^2$ and the opening 26 is closed. The endless chain 8 is moved in the direction of arrow $F^3$ by its motor 27 driven by a reducing gear 28, and a device (not shown) causes the chain to stop when the glass plates are in any of the compartments 1, 2, 3, 4. The distance between two successive compartments is equal to the distance between the frames 9 on the chain 8. In this way, the glass plates uninterruptedly follow each other through the various compartments 1, 2, 3, 4, said plates stopping in each compartment for the time necessary for the thermal exchanges.

The glass plates 10 thus are, in accordance with this invention, moved vertically through successive heating rooms, where they are subjected to the required temperatures.

The thermal treatment of these glass plates or sheets therefore is carried out with a minimum deformation since the sheets are subjected to a minimum handling. Furthermore said sheets keep their thickness over their whole surface so that the risk of breaking is further reduced. The aerothermal treatment of the glass sheets in the compartment 3 may be regulated at will by varying the spacing of the hot air blowing collectors $20^1$, $20^2$ as explained above.

At the outlet of the last compartment 4, the glass sheets 10 are withdrawn by tilting along $F^1$, the trays or frames carrying them. Said glass sheets may then be carried away by a truck 30 or a conveyor.

What is claimed is:

1. In an apparatus for the manufacture of hardening glass plates, in combination, a plurality of compartments placed vertically, one above the other and communicating with each other, an endless carrier moving at least partly vertically, and through the vertically placed compartments, tiltable frames carried by said endless carrier as supporting means for the glass plates, means for submitting the glass plates in each compartment to a different treatment whilst traversing the compartments successively from the one situated at the lowest level to the one situated at the highest level, the lowest compartment being a first preheating compartment and being provided with a lateral opening for the introduction therethrough of a glass plate and for the depositing thereof on one of the frames which has been put in the inclined position, a second high temperature heating compartment, a third tempering compartment and a fourth temperate cooling compartment.

2. In an apparatus for the manufacture of hardening glass plates, in combination, a plurality of compartments placed vertically, one above the other and communicating with each other, an endless carrier moving at least partly vertically, and through the vertically placed compartments, tiltable frames carried by said endless carrier as supporting means for the glass plates, means for submitting the glass plates in each compartment to a different treatment whilst traversing the compartments successively from the one situated at the lowest level to the one situated at the highest level, the lowest compartment being a first preheating compartment and being provided with a lateral opening for the introduction therethrough of a glass plate and for the depositing thereof on one of the frames which has been put in the inclined position, a second high temperature heating compartment, a third tempering compartment comprising on every side of the endless carrier a multitubular collector having multiple ejecting nozzles for superheated air under pressure, and a fourth temperate cooling compartment.

3. In an apparatus for the manufacture of hardening glass plates, in combination, a plurality of compartments placed vertically, one above the other and communicating with each other, an endless carrier moving at least partly vertically, and through the vertically placed compartments, tiltable frames carried by said endless carrier as supporting means for the glass plates, means for submitting the glass plates in each compartment to a different treatment whilst traversing the compartments successively from the one situated at the lowest level to the one situated at the highest level, the lowest compartment being a first preheating compartment and being provided with a lateral opening for the introduction therethrough of a glass plate and for the depositing thereof on one of the frames which has been put in the inclined position, a second high temperature heating compartment, a third tempering compartment comprising on every side of the endless carrier a multitubular collector having multiple ejecting nozzles for superheated air under pressure, and a fourth temperate cooling compartment, the heating means for the lowest compartment being used for heating at the same time the air under pressure for the tempering treatment.

4. In apparatus for the manufacture of hardening glass plates, in combination, a plurality of compartments placed vertically one above the other and communicating with each other, an endless carrier moving at least partly vertically, and through the vertically placed compartments, tiltable frames carried by said endless carrier as supporting means for the glass plates, means for submitting the glass plates in each compartment to a different treatment whilst traversing the compartments successively from one situated at the lowest level to the one situated at the highest level, the lowest compartment being a first preheating compartment and being provided with a lateral opening for the introduction therethrough of a glass plate and for the depositing thereof on one of the frames which has been put in the inclined position, a second high temperature heating compartment, a third tempering compartment comprising on every side of the endless carrier a multitubular collector having multiple ejecting nozzles for superheated air under pressure, and a fourth temperate cooling compartment, and means whereby the air for the tempering treatment is heated by the heating means arranged in the lowest compartment and is adducted to the ejecting nozzles of the tempering compartment.

5. In an apparatus for the manufacture of hardening glass plates, in combination, a plurality of compartments placed vertically one above the other and communicating with each other, an endless carrier moving at least partly vertically, and through the vertically placed compartments, tiltable frames carried by said endless carrier as supporting means for the glass plates, means for submitting the glass plates in each compartment to a different treatment whilst traversing the compartments successively from the one situated at the lowest level to the one situated at the highest level, the lowest compartment being a first preheating compartment and being provided with a lateral opening for the introduction therethrough of a glass plate and for the depositing thereof on one of the frames which has been put in the inclined position, a second temperature heating compartment, a third tempering compartment comprising on every side of the endless carrier a multitubular collector having multiple ejecting nozzles for superheated air under pressure and a fourth temperate cooling compartment, means whereby the air for the tempering treatment is heated by the heating means arranged in the lowest compartments and is adducted to the ejecting nozzles of the tempering compartment, and means whereby the temperate cooling compartment is heated by convection by the residual hot air ascending from said tempering compartment and passing through the communication between the the two compartments.

ANNA LUCIE ROBERT REMBAUX,
GERMAINE MATHILDE VALERIE
REMBAUX THOMASSIN,
*Sole Representatives of the Estate of Leon Rembaux, Deceased.*

REFERENCES CITED

The following references are of record in the file of this patent:

UNITED STATES PATENTS

| Number | Name | Date |
|---|---|---|
| 1,334,569 | Temple et al. | Mar. 23, 1920 |
| 1,795,819 | Axell | Mar. 10, 1931 |
| 1,999,588 | Fox et al. | Apr. 30, 1935 |
| 2,026,165 | Goodwillie | Dec. 31, 1935 |

FOREIGN PATENTS

| Number | Country | Date |
|---|---|---|
| 316,120 | Italy | Mar. 21, 1934 |
| 406,606 | Great Britain | Mar. 1, 1934 |
| 442,613 | Belgium | Oct. 31, 1941 |
| 678,870 | Germany | July 24, 1939 |